US006998197B2

(12) United States Patent
Fjeldstad et al.

(10) Patent No.: US 6,998,197 B2
(45) Date of Patent: Feb. 14, 2006

(54) DEVICE FOR REGISTRATION OF OPTICAL HOLOGRAMS ON THE AMORPHOUS MOLECULAR SEMICONDUCTOR FILMS

(75) Inventors: John Petter Fjeldstad, Sandefjord (NO); Irina Evgenievna Fjeldstad, Sandefjord (NO); Leonid Mikhailovich Lobanov, Kiev (UA); Vjacheslav Avtonomovich Pivtorak, Kiev (UA); Nikolay Georgievich Kuvshinsky, Kiev (UA); Leonid Ivanovich Kostenko, Donetsk (UA); Andrey Konstantinovich Kadashchuk, Kiev (UA); Vladimir Petrovich Kushniruk, Kiev (UA); Valeriy Aleksandrovich Pavlov, Kiev (UA)

(73) Assignee: HoloTech A.S., Sandefjord (NO)

( * ) Notice: Subject to any disclaimer, the term of this patent is extended or adjusted under 35 U.S.C. 154(b) by 60 days.

(21) Appl. No.: 10/172,973

(22) Filed: Jun. 18, 2002

(65) Prior Publication Data
US 2002/0155355 A1 Oct. 24, 2002

Related U.S. Application Data

(62) Division of application No. 09/596,556, filed on Jun. 19, 2000.

(30) Foreign Application Priority Data
Jun. 8, 2000 (NO) .................................. 20002948

(51) Int. Cl.
*G03H 1/02* (2006.01)
(52) U.S. Cl. .............................. 430/1; 430/2; 430/394; 359/35; 359/6; 359/3
(58) Field of Classification Search .................. 490/1, 490/2, 394, 50; 359/3, 6, 35
See application file for complete search history.

(56) References Cited

U.S. PATENT DOCUMENTS 3,170,008 A * 2/1965 Levine ........................ 430/19

(Continued)

FOREIGN PATENT DOCUMENTS

RU 1805445 3/1993

(Continued)

OTHER PUBLICATIONS

Panasyuk et al., Process of double-exposure interferogram formation on deformed surface of thermoplastic media, SPIE vol. 2851, pp. 150-157 (Aug. 1996).*

(Continued)

*Primary Examiner*—Martin Angebranndt
(74) *Attorney, Agent, or Firm*—Birch, Stewart, Kolasch & Birch, LLP

(57) ABSTRACT

This invention relates to the field of holography, in particular to a method and a device for recording optical holograms by means of amorphous molecular semiconductor (AMS) films deposited on a glass substrate pre-covered with a transparent electric conducting sub-layer. More precisely, the invention relates to a method and device for registering optical holograms on AMS-films which operates in such a way that the AMS-films possess the maximum achievable information parameters: Holographic sensitivity, optimal spatial frequency of the transmitted characteristic, band parameters for the spatial frequencies of the transmitted characteristic, "signal-to-noise" ratio in the restored holographic image, reference and object beam intensities ratio during hologram registration, and cycling ability. It is also an advantage that the device provides optimal operation efficiency of the registering media based on AMS-films, and restricts the development and erasing of the hologram upon reaching the pre-set value of the diffraction efficiency measured in the zeroth order of diffraction. The latter makes the device a universal device.

4 Claims, 1 Drawing Sheet

U.S. PATENT DOCUMENTS

Figure 1:
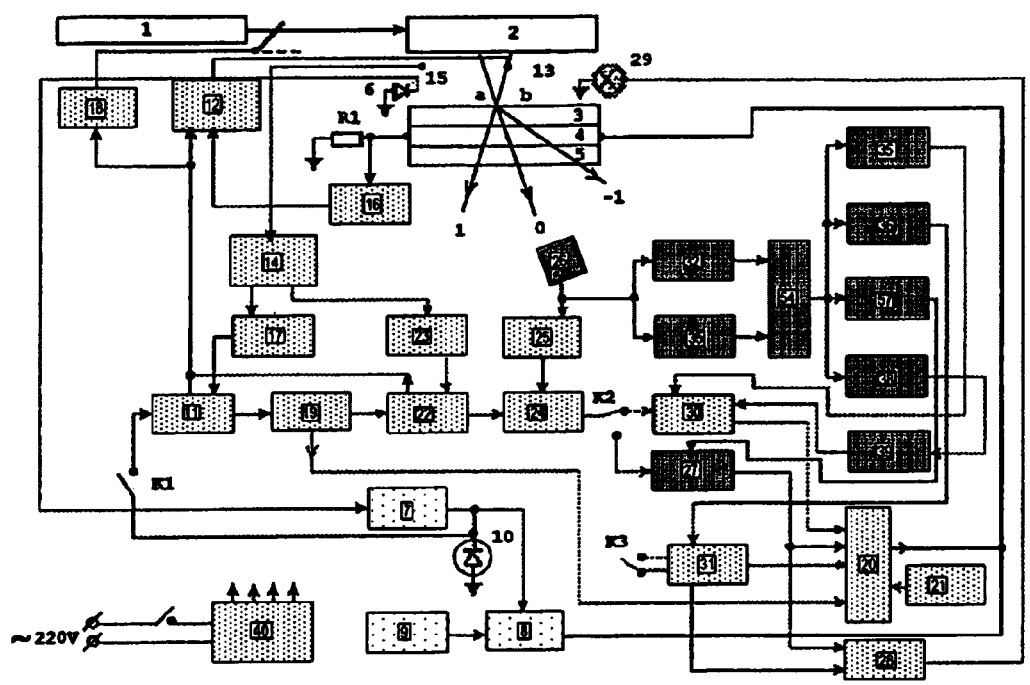

| | | | |
|---|---|---|---|
| 3,318,698 A * | 5/1967 | Schwertz | 430/50 |
| 3,338,710 A * | 8/1967 | Goffe | 430/50 |
| 3,419,885 A * | 12/1968 | Augostini | 347/113 |
| 3,443,938 A * | 5/1969 | Gundlach et al. | 430/50 |
| 3,485,623 A * | 12/1969 | Wilferth et al. | 430/50 |
| 3,997,238 A | 12/1976 | Oride et al. | |
| 4,101,321 A * | 7/1978 | Levy et al. | 430/15 |
| 6,522,409 B1 * | 2/2003 | Fjeldstad et al. | 356/457 |
| 6,558,851 B1 * | 5/2003 | Fjeldstad et al. | 430/1 |
| 6,628,399 B1 * | 9/2003 | Fjeldstad et al. | 356/458 |

FOREIGN PATENT DOCUMENTS

| | | |
|---|---|---|
| RU | 1807444 | 4/1993 |

OTHER PUBLICATIONS

Author Certificate (English translation) of SU 1807444.*

"Photothermoplastics for Spectral Holography", YU.A. Cherkasov et al., *Optics & Laser Technology*, vol. 28, No. 4, pp. 291-295, 1996.

"Real-Time Holographic Camera System", M. Yu. Bazhenov et al., *The International Society for Optical Engineering Conference*, vol. 3011, pp. 348-355, 1997. (abstract only).

"Standardization of the Recording and Erasing of Optical Information in a Multipe-Unit Photothermoplastic Matrix of Holograms", A.A. Ayazyan et al., *Avtometriya*, No. 2, pp. 84-87, 1980. (citation only).

"The Control of Erasure of Holograms on Thermoplastic Carbazole-Containing Polymeric Semiconductors", A.M. Belonozhko et al., *Zh. Nauch. Prikl. Fotogr. Kinematogr.*, vol. 33, No. 2, pp. 133-135, 1988. (citation only).

"Physical Models of a Charged Thermoplastic Medium and a Latent Image in the Photplastic Recording of Holograms", N.G. Kuvshinskii et al., *Fundatment. Osnovy Optich. Pamyati i Sredy*, No. 10, pp. 97-113, 1979. (citation only).

Translation of Norwegian Patent Application No. 1999 5273, "Optical medium for Registration of holographic Interferograms" Nikolay G. Kuvshinsky et al.,.

Translation of Norwegian Patent Application No. 1999 5311, "Method and Device For Non-Destructive Inspection of Objects by Means by Optical Holographic Interferometry".

Translation of Norwegian Patent Application No. 1999 5312, "Method and Device For Non-Destructuve Determination of Residual Stresses In Objects By Optical Holographic The Interferometry Technique", Lobanov L. Michaelovich, et al.

* cited by examiner

DEVICE FOR REGISTRATION OF OPTICAL HOLOGRAMS ON THE AMORPHOUS MOLECULAR SEMICONDUCTOR FILMS

This application is a divisional of co-pending application Ser. No. 09/596,556, filed on Jun. 19, 2000, the entire contents of which are hereby incorporated by reference and for which priority is claimed under 35 U.S.C. § 120; and this application claims priority of Application No. 2000 2948 filed in Norway on Jun. 8, 2000 under 35 U.S.C. § 119.

This invention relates to the field of holography, in particular to a method and a device for recording optical holograms by means of amorphous molecular semiconductor (AMS) films deposited on a glass substrate.

BACKGROUND

A particular suited media for recording optical holograms are amorphous molecular semiconductor films. In this invention it is preferred to employ an AMS-film deposited on a glass substrate pre-covered with a conducting sub-layer, where the AMS-film consists of 92 wt % of a copolymer comprising N-epoxypropylcarbazole and 5 wt % buthylglycedil ether, doped with 5 wt % of methyl-9-(4-dodecyl-oxyphenyl-1,3-selenathiol-2-ylidene)-2,5,7-trinitrofluorene-4-carboxylate (MDOSTFC) and 4 wt % of hexadecyl-2,7-dinitro-dicyanomethylenfluorene-4-carboxylate (H-DDFC). The composition and functioning of this and similar AMS-films are thoroughly discussed and explained in the applicant's Norwegian application no. 19995273, and is incorporated herein by reference.

Optical holographic interferometry technique is well suited for non-destructive testing of internal defects in blocks and units of machines and devices, welded seams, as well as measuring stresses of an object during the object's work load and residual stresses caused by technological processes of welding, forging, soldering etc. These applications are useful for fields such as offshore oil industry, shipping industry, process industry, air industry, and all types of constructions where strength is vital or fatigue may cause a problem.

The principle of optical holographic interferometry can very briefly be described as follows: First a hologram of the investigation area of the object is registered and developed by means of the registering medium. Then the investigation area of the object is subject to a load and slightly deformed. Finally, the investigation area of the object and the registering medium containing the first developed holographic are simultaneously illuminated by the object and reference beam respectively. This results in two simultaneous light waves behind the registering medium, one corresponds to the light wave scattered by the investigation area before loading and the other to the light wave scattered by the investigation area after being exposed to the load. An interferogram of the investigation area is created as a result of the superimposition of these two light waves, and eventual defects in the object are revealed by anomalies in the interference fringe pattern. The principle of the holographic interferometry technique and equipment needed to perform this technique in order to reveal defects and measure internal stresses are given in the applicant's Norwegian applications nos. 19995311 and 19995312. Both applications are incorporated herein by reference.

As mentioned, this invention relates to a method and a control device for performing registration of holograms on an AMS-flim.

STATE OF THE ART

The closest technological solution known to us is the device for registration of optical holograms described in patent SU 1807444 "Device for registration of optical holograms on thermoplastic media". This device is intended for registration and development of holograms on an AMS-film where the AMS-film is deposited on a glass substrate pre-coated with an electrically conductive sub-layer. The device comprises:

- an registering medium comprising an AMS-film deposited on a transparent conducting sub-layer which itself is deposited on a glass substrate,
- an optical scheme for hologram formation,
- an electromechanical shutter which intercepts the laser beam during charging of the AMS-film surface with corona discharges,
- a high-voltage unit with a corona electrode,
- a corona charging time-relay,
- a hologram expose time-relay determining the time of the electrostatic latent image formation,
- a development time-relay which determines the time of connection of the key-commutator and development voltage unit to the transparent conducting sub-layer for heating the AMS-film and developing the latent electrostatic image into a geometrical relief on the film surface,
- a developed hologram image reading time-relay,
- a developed hologram image erasing time-relay which determines the time of connection of the key-commutator with the development voltage unit to the transparent conducting sub-layer,
- a development and erasing restriction unit using the preliminary set value of the diffraction efficiency and the photo-sensor installed in the minus first diffraction order, and which disconnects the key-commutator and transparent conducting sub-layer as soon as the diffraction efficiency of the restored hologram image has reached the preliminary set value during the development or erasing process,
- an electronic time-relay of the AMS-film cooling prior the next cycle of hologram registration and development,
- a temperature sensor with integrator determining the mean temperature of the AMS-film,
- a comparator which compares the mean temperature of the AMS-film with the preliminary set temperature and which cuts off an other key commutator as soon as the mean temperature of the AMS-film reaches the preliminary set value. During this period, the AMS-film cooling time-relay cannot activate the corona charging time-relay and the device operation is terminated.

The operation of the device is realised in the following manner: By switching on the power of 220 V, the voltage is supplied to all units and time-relays. Then, all time-relays are set in the initial state—logic "zero" at the output, the key-commutator is switched off and other key-commutator is switched on, since the AMS-film has not been heated to the mean temperature at which the comparator switches on. The process of hologram registration initiates by turning on the charging time-relay which switches on the high-voltage unit, which again charges the AMS-film (in this case by a corona discharge generated by the corona electrode). The electromechanical shutter intercepts the laser beam during the charging. After finishing the charging process, the trailing edge of the charging pulse switches on the expose time-relay. While the relay is in "ON" state, the registration of a hologram with a laser and the optical hologram registration scheme occurs. A latent electrostatic image is formed during the hologram registration. The trailing edge of the pulse of the relay switches on the development time-relay, which switches on the key-commutator via the development and erasing restriction unit employing the preliminary set value of the diffraction efficiency and connects the development voltage unit to the transparent conducting sub-layer of the registering medium. In this case, the transparent conducting sub-layer and the AMS-film is heated up, and the latent electrostatic image develops into the geometrical relief of the film surface. The development process is restricted by a pre-set diffraction efficiency, by means of the development and erasing restriction unit using the preliminary set value of the diffraction energy. After that, the developed image is fixed by the AMS-film cooling due to a heat removal to the glass substrate, and it can be read during the time controlled by the image reading time-relay.

When the device operation is in cyclic mode, the erasing time-relay is switched on after the termination of operation of the relay and the developed image is erased. The leading edge of the pulse of the relay switches on the key-commutator via the development and erasing restriction unit using the preliminary set value of the diffraction efficiency and connects the development voltage unit to the transparent conducting sub-layer. In this case, the erase restriction is realised by the pre-set value of the diffraction efficiency by means of the development and erasing restriction unit using the preliminary set value of the diffraction efficiency. After termination of the erasing process, the AMS-film cooling occurs due to a heat removal to a glass substrate during the period controlled by the electron cooling time-relay. After termination of operation of the electronic cooling relay, the charging time-relay is switched on again (if the mean temperature of the AMS-film is lower than the pre-set value in the development/erasing comparator), and the cycle of hologram registration/erasing is repeated.

The mean temperature of the registering medium progressively increases at its continuous cyclic operation and it may reach a value at which the hologram registration would be impossible and the destruction of the registering medium might occur. In order to prevent this, an electric circuit is incorporated in the device, which terminates its operation as soon as the mean temperature of the AMS-film reaches the preliminary given value. This function in the device is realised in following way: The temperature of the AMS-film is measured with the temperature sensor. A signal from its output proceeds to the integrator having the constant-time of the order of several seconds, that allows to exclude the influence of a pulse heating on the mean temperature value. A signal proportional to the mean temperature proceeds from the integrator output to the comparator where it is compared with that corresponding to a pre-set temperature. Comparator operates in response to the coincidence of the signal magnitudes, and its output signal cuts off the other key-commutator, and disconnects output of the cooling time-relay from the input of charging time-relay. Cyclic operation of the device is terminated.

However, despite allowing restriction of the development and erasing processes by the fundamental parameter, namely the diffraction efficiency, and the termination of cyclic operation of the device when the mean temperature of the AMS-film reaches the pre-set value, this device has a number of essential drawbacks:

It does not allow the maximum achievable and reproducible band parameters for spatial frequencies of the transmitting characteristics, the optimal spatial frequency of the transmitting characteristics, the resolution, holographic sensitivity, and the "signal-to-noise" ratio in the restored holographic image, which are determined by the heating rate of the AMS-film during the development of the latent electrostatic image. This is due to a missing possibility of setting an optimal initial temperature of the registering medium that would give reproducible optimal heating rate of the AMS-film at the same magnitude of the development voltage pulse.

It does not allow to obtain the optimal surface potential at which the local breakdowns of the AMS-film have yet not occurred, as well as the optimal charging current of the corona discharge at which the AMS-film surface is not damaged under ion deposition. Thus, it does not allow to reach the maximum achievable and reproducible values of the signal-to-noise ratio in the restored holographic image, the ratio of reference-object beam intensities at hologram registration, the spatial frequency band of transmitting characteristic, the optimal spatial frequency of transmitting characteristic, and the holographic sensitivity. This is caused by the device's lack of control of the charging current of the corona discharge, and the measurement and restriction of the surface potential of AMS-film during its charging by the corona discharge.

It does not reach the maximum achievable band parameters for spatial frequencies of the transmitting characteristics, the optimal spatial frequency of the transmitting characteristics, the holographic sensitivity, and the "signal-to-noise" ratio that are partly being determined by the relaxation rate of the latent electrostatic image prior to and during the development process, since the device does not provide reduction of the dark conductivity.

It can not be employed for double-exposure holographic interferometry when the delay time after registration of the first hologram exceeds 1 min, since the device does not provide the formation of a long-lived latent image having large relaxation times.

It does not allow preservation of the high "signal-to-noise" ratios, the band of spatial frequencies of the transmitting characteristics, the optimal spatial frequency of the transmitting characteristics, the holographic sensitivity under the repeated registrations, and the development and erasing of holograms that are determined in part by the time and temperature of erasing of the developed image, since the device does not provide the elimination of the surface- and bulk space charges of the AMS-film prior to the erasing of the developed image.

The photo-sensor of the unit for erasing restriction by the pre-set value of the diffraction efficiency should be first installed in the zeroth diffraction order and measure light intensity in the reference beam in advance of the hologram development process. Thereafter, it should be installed in the minus first diffraction order, the position of which can be changed at replacement of a holographic object. Thus, the device is not a universal device that is independent on the optical scheme of hologram registration. Besides, the device does not provide termination of the hologram developing process in the case when the diffraction efficiency for some reason cannot reach the pre-set value. The latter circumstance can lead to overheating the AMS-film and its failure.

The device does not provide the automatic determination of exposure time and consequently, automatic setting of the operation time for the expose time-relay. Manual determination of the expose time and the adjustment of the expose time-relay reduce the operation efficiency of the device.

OBJECT OF INVENTION

The main object of the invention is to provide a method and a universal device for registration of optical holograms on AMS-films which overcomes the deficiencies mentioned above, and which permits creation of latent electrostatic images either in form of a modulated surface charge density or a modulated photoelectret state in order to be able to perform the double-exposure holographic interferometry technique.

It is also an object of the invention to provide a device for registration of optical holograms that allows setting of an optimal initial temperature of the AMS-film, achieves the maximum surface potential during charging of the AMS-film prior to registration of the holographic image, reduces the dark conductivity of the AMS-film to a minimum, is able to create long lived latent images, eliminates the bulk and surface space charges of the AMS-film prior to erasing the developed image, restricts the development and erasing process by the pre-set value of the diffraction efficiency as measured in the zeroth order of diffraction, provides automatic determination of exposure times, and that is suitable for universal use and which is independent upon the optical scheme employed.

SHORT DESCRIPTION OF THE FIGURE

FIG. 1 gives a schematic representation of the universal device for recording optical holograms according to the invention.

BRIEF DESCRIPTION OF THE INVENTION

The objects of the invention can be achieved by the device and method described in the appended claims and in the discussion given below.

The objectives of the invention can be achieved by a control device for registering optical holograms on AMS-films which operates in such a way that the AMS-films possess the maximum achievable information parameters, namely by obtaining the greatest possible values for: Holographic sensitivity, optimal spatial frequency of the transmitted characteristic, band parameters for the spatial frequencies of the transmitted characteristic, "signal-to-noise" ratio in the restored holographic image, reference and object beam intensities ratio during hologram registration, and cycling ability. It is also an advantage that the device provides optimal operation efficiency of the registering media based on AMS-films, and restricts the development and erasing of the hologram upon reaching the pre-set value of the diffraction efficiency measured in the zeroth order of diffraction. The latter makes the device a universal device.

A preferred way to achieve these ideal operation conditions is to incorporate the following characteristic features into the previously discussed device (see SU 1807444). These features are:

Develop the latent electrostatic image into a geometrical relief at the optimal heating rate of the AMS-film, and initiate the heating at an optimal film temperature.

Charge the surface of the AMS-film prior to recording of the image at a pre-set and firmly controlled maximum charging current up to the maximum allowable surface potential of the AMS-film.

Reduce the electron and hole components of the dark conductivity of the AMS-film.

Eliminate the surface- and bulk space charges of the AMS-film prior to the erasing of the developed image.

Form a latent photoelectret hologram image that has large relaxation times which allows the use of registering media based on AMS-films in optical schemes of double-exposure holographic interferometry.

Measure the diffraction efficiency of holograms in the zeroth diffraction order

Restrict the hologram development process not only by the pre-set value of diffraction efficiency, but also by the equality to zero of the first derivative of the dependence of the diffraction efficiency on the development time.

The above given features are preferred since they make the device very versatile, so called "universal" and independent of the employed optical scheme of hologram formation. In order to increase the operation efficiency of the device, an automatic determination of exposure time and automatic setting of the operation time for the exposure time-relay may be included.

DETAILED DESCRIPTION OF THE INVENTION

The invention will now be described in greater detail by reference to the block-diagram presented in FIG. 1 which show a control device for registering optical holograms according to a preferred embodiment of the invention. The control device consists of:

A source 1 of coherent light (laser) with an optical scheme 2 of hologram formation, a registering medium 3–5, where 3 is the AMS-film containing 92 wt % of a copolymer comprising N-epoxypropylcarbazole copolymer with 5 wt % buthylglycedile ether doped with 5 wt % methyl-9-(4-dodecyl-oxyphenyl-1,3-selenathiol-2-ylidene)-2,5,7-trinitrofluorene-4-carboxylate (MDOSTFC) and 4 wt % hexadecyl-2,7-dinitro-dicyanomethylenfluorene-4-carboxylate (HDDFC), an electric circuit 6–10 for the setting of the optimal initial temperature of the registering medium, where 6 is a temperature sensor installed immediately on the AMS-film surface 3, 7 is an initial temperature comparator which sets the initial temperature, compares the measured temperature of registering medium with the preliminary set value, and switches on the initial temperature key-commutator 8 when the above temperatures are coincident, 9 is the initial temperature power source, and indicator 10 displays "Ready" as soon as the measured value of initial temperature reaches the pre-set value, an electric circuit 11–18 for the charging of the AMS-film surface by corona discharges and for controlling the corona discharges, where 11 is an electronic charging time-relay which switches on a high voltage source 12, 13 is a corona electrode, 14 is a surface potential measuring unit with an electrostatic probe 15, 17 is a surface potential comparator in which the surface potential of charging is pre-set and which terminates operation of the charging time-relay 11 as soon as the measured value of the surface potential reaches the preliminary set value, 16 is a corona discharge current measuring unit which measures the corona current and tunes the high voltage of the unit 12 as soon as measured corona discharge current deviates from the pre-set value, 18 is an electromechanical shatter which intercepts a laser beam during the AMS-film surface charging with corona discharge, an electric circuit 11–23, 41 for the reduction of the hole and electron components of the dark conductivity of the AMS-film, where the functions of elements 11–18 has been described above, 19 is a pulse preliminary heating electronic time-relay for the corona charged AMS-film which connects a development-erasing voltage unit 21 to the transparent conducting sub-layer 4 of the registering medium via a switched on development-erasing key-commutator 20, 41 is a dark electroconductivity comparator which cuts off the pulse preliminary heating time-relay 19 as soon as the AMS-film surface potential reaches 0.8 of the initial maximal allowed value, 22 is an electronic recharging time-relay for the recharging of the AMS-film surface to the pre-set value of the surface potential given by a comparator 23, an opto-electronic circuit 26–24 for determination and adjustment of the exposure time, where a photo-sensor 26 which is measuring the light intensity in the reference beam is installed in the zeroth diffraction order, 25 is an exposition determining unit which terminates operation of an exposure time-relay 24 as soon as its operation time reaches the value determined by the unit 25, an electric circuit for the formation of a latent photoelectret image which contains the above considered units and elements 11–26. as well as the following novel units and elements K2, 27,28,29, where K2 is a button marked "Photoelectret state" which connects the exposure time-relay 24 output to the input of a latent photoelectret image formation time-relay 27, while this relay switches on the development/erasing key-commutator 20, and connects it via the development-erasing voltage unit 21 to the transparent conducting sub-layer 4 for the period of latent photoelectret image formation in the AMS-film, this time is restricted by an opto-electric scheme 26, 32–34,37 of a latent electrostatic image formation restriction given as a pre-set value of the diffraction efficiency comprising 0.005%, 28 is the switching unit for a flash lamp 29 which turns it on for fixing the latent photoelectret image as soon as the photoelectret image formation time relay 27 terminates the operation, an electric circuit 30,20,21 for development of the latent electrostatic and photoelectret images, where 30 is a development time-relay which switches on the development/erasing key-commutator 20 and connects it via the development-erasing voltage unit 21 for the time of development of latent electrostatic and photoelectret image, which is restricted by an opto-electronic circuit 26,32–34,35 of the development restriction given by a pre-set value of the diffraction efficiency ranging within 0.5–30%, an electric circuit K3,31,20,21 for erasing the developed image, where K3 is a button marked "erasing" which in "ON" state switches on the erasing time-relay, the relay in its turn switches on the development/erasing key-commutator 20 and connects it via the development/ erasing voltage unit 21 to the transparent conducting sub-layer 4 during the period of the developed image erasing, which is restricted by an opto-electric circuit 26,32–34,36 for erasing restriction given by a pre-set value of the diffraction efficiency, an opto-electric circuit 26,32–34,35 for development restriction given by the pre-set value of diffraction efficiency, where 26 is the photo-sensor installed in the zeroth diffraction order, 32 is a unit of separation and measurement of the variable component of the reference beam light intensity, 33 is a unit for measuring and memorising the reference beam intensity prior to the latent image development, 34 is a diffraction efficiency calculating unit, 35 is a development comparator where a pre-set value of diffraction efficiency ranging within 0.5–30% is adjusted and where a comparison of measured diffraction efficiency with the pre-set value occurs, the comparator 35 switches off the development/erasing key-commutator 20 when the measured diffraction efficiency coincides with the pre-set value, and thus terminates the development process, an opto-electric circuit 26,32–34,36 for erasing restriction by the pre-set value of diffraction efficiency, where 26,32–34 are elements and units which are described above and 36 is a comparator which switches off the development/erasing key-commutator 20 as soon as the measured value of diffraction efficiency reaches the pre-set value, an opto-electric circuit 26,32–34,37 for restriction of the latent image transformation into the latent photoelectret image, where 26,32–34 are elements and units which are described above and 37 is a pulse preheating comparator which participates in formation of the latent photoelectret image and terminates the AMS-film heating as soon as the diffraction efficiency reaches the value of 0.005, an opto-electric circuit 26,32–34,38,39 for restriction of the development process by reaching the maximum of the dependence of diffraction efficiency on the development time, where 26,32–34 are elements and units described above, 38 is a differentiator which calculates the first derivative of the dependence of the diffraction efficiency on the development time, and 39 is a comparator of the differentiator which switches on the development/erasing commutator 20 as soon as the first derivative of the above dependence equals to zero, and a low-voltage supply unit 40.

Operation of the Device

In optical schemes of the holographic interferometry, as well as in other schemes of optical holography, the device can operate in two modes: A "real-time scale mode" and a "double exposure mode".

Before activating the device in one of these operation modes, one should switch the device on and perform an initial preparation of the device that includes setting the optimal starting temperature of the registering medium. Besides, the device has a separate final operating mode, "the mode of erasing of the developed image".

The "real-time scale mode" consists of four successive stages. The first stage is charging of the AMS-film surface by a controlled corona discharge. The second stage is reduction of electron and hole components of the dark conductivity of the AMS-film. The third stage is an exposure of the hologram. accompanied with the formation of the latent electrostatic image. The fourth stage is the development of the latent electrostatic image of the hologram up to the level of the preliminary set value of diffraction efficiency.

The double exposure mode" includes the first three stages of the "real time scale mode" and two additional stages, namely formation of latent photoelectret image and fixation of the latent photoelectret image. The development of the latent photoelectret image is performed when the device operates in the "real time scale mode" .

The "mode of erasing of developed image" is run by the researcher manually and consists of two stages, a stage of reducing the surface—and bulk space charge of the AMS-film, and thereafter erasing the developed image on the hologram.

By switching on the device, the device becomes connected to a power supply with voltage 220 V. Then the supply unit of low-voltage circuits 40 switches on and the power is supplied to all units of the device. The laser 1 is switched on, all time-relays are reset into their initial state, logical "zero" is set on output, the starting temperature key-commutator 8 is open, the development/erasing key-commutator 20 is closed, and the electric circuit 6–10 for setting the optimal initial temperature of the registering medium begins to work.

Setting the optimal starting temperature for the recording medium. The value of the optimal starting temperature should be determined beforehand, during the studies of information properties of the registering medium. For the chosen registering medium, the optimal starting temperature is within 35–40° C. depending on the ratio of the mass part of its components. It is pre-set in the starting temperature comparator 7. After switching on the device, the starting temperature voltage source 9 is connected to transparent conducting sub-layer 4 of the registering medium via opened starting temperature key-commutator 8. The electric current goes through the transparent conducting sub-layer 4, which is being heated up and thereby heats the AMS-film 3. A temperature sensor 6 continuously measures the temperature of the AMS-film, and the value of temperature is continuously applied to the starting temperature comparator 7. As soon as the measured value of the temperature reaches the pre-set value in the starting temperature comparator 7, the latter cuts off the starting temperature key-commutator 8 and heating of the transparent conducting sub-layer terminates. This is accompanied with lighting the indicator "Ready" 10 which signals that the "device" is ready to start operation, because the output voltage of the starting temperature comparator is sufficient for switching on the charging time-relay 11.

The Real Time Scale Mode.

Activation of the device in "real time scale mode". In this operating mode, the button K2 "Photoelectret state" is in its initial state at which the output of the expose time-relay 24 is connected to the input of the development time-relay 30. Pressing the button K1 "Start" activates the device. Thus, the starting temperature comparator 7 switches on the charging time-relay 11, and the process of charging the AMS-film surface 3 begins.

Charging the Surface of the AMS-Film in Controlled Corona Discharge.

This process is performed by means of electric circuits 11–18 for charging of the AMS-film surface in corona discharge and for corona discharge control. After switching on: The charging time-relay 11 switches on the electromechanical shutter 18 which shuts the laser beam I for the time of the charging process, it switches on the high voltage source 12, thus high voltage is applied to the corona electrode 13. A corona discharge is created over the surface of the AMS-film 3, and positive ions are deposited on its surface. During the charging of the AMS-film surface 3, the constant maximal allowable pre-set value of the corona discharge current is hold at which the destruction of the AMS-film surface by the bombarding positive ions is not yet observed. This is performed by the corona discharge current measuring unit 16, which acts as a stabiliser of the voltage dropping on the resistor R1. In the case of deviation of the voltage on this resistor from the pre-set value, the corona discharge current measuring unit 16 performs necessary changes of the output voltage of the high voltage source 12, and thus it holds the constant value of the corona discharge current.

The process of charging the AMS-film surface 3 up to pre-set maximum allowed value of the surface potential is performed in the following way: The value of the surface potential should be experimentally determined in advance (during the study of information properties of the registering medium) and loaded into the surface potential comparator 17. The surface potential is continuously measured by the probe 15 and the surface potential measuring unit 14 during the charging of the AMS-film surface 3, and the measured value is applied as input to the surface potential comparator 17, where it is compared with the pre-set value of surface potential. In the case of coincidence of these values, the surface potential comparator 17 interrupts the operation of the time-relay 11, which then cuts off the high voltage source 12, and the process of charging the AMS-film surface terminates.

Reduction of the electron and hole component of the dark conductivity of the AMS-film is performed by the "electric circuit for reduction of the electron and hole component of the dark conductivity of the AMS-film" 11–23, 41. Elements and units 11–18 are also used in "electric circuit for charging the AMS-film in the corona discharge and for corona discharge control". The controlled charging of the film surface in corona discharge has been considered in the previous section. This procedure can also be considered as the first step in the process of reducing the electron and hole component of the dark conductivity. The second step, which immediately follows the first one, is the pulse heating of the charged AMS-film 3. The trailing edge of the pulse of the charging time-relay 11 switches on the pulse preliminary heating time-relay 19, which in its turn opens the development-erasing key commutator 20 and connects the development-erasing voltage unit to the transparent conducting sub-layer 4. The latter is heated and heats the AMS-film 3 for a sufficient time for reducing the considered components of the dark conductivity. In the course of continuous reduction of the dark conductivity, a decrease of the surface potential also occurs and the latter value comprises 0.8 of the maximal allowable value by the moment when the dark conductivity has been reduced. This value of the surface potential is used by the device for the time restriction of the pulse preliminary heating of the AMS-film 3, and it is applied to the dark conductivity comparator 41. The probe 15 and surface potential measuring unit 14 measure the surface potential during the pulse preheating. As soon as it is equal to 0.8 of its maximal allowable starting value, the comparator 41 cuts off the pulse preliminary heating time-relay 19 and the process of pulse preheating terminates. The trailing edge of the pulse of the pulse preliminary heating time relay 19 opens the recharging time-relay, which in its turn switches on the high voltage source 12, and the AMS-film surface 3 is recharged to the starting maximal allowable value of the surface potential. The recharging of the AMS-film surface occurs also in a controlled corona discharge where the control of the corona current is performed by the corona discharge current control unit 16 (see the stage "charging of the AMS-film surface in controlled corona discharge"). The restriction of the surface potential, to which the recharging is to be performed, is realised by the recharging comparator 23. As soon as the surface potential measured with the probe 15 and surface potential measuring unit 14 becomes equal to the maximal allowable value, the recharging comparator 23 cuts off the recharging time-relay 22 and the process of recharging terminates.

Exposing the Hologram.

The trailing edge of the pulse of the recharging time-relay 22 cuts off the electromechanical shutter 18 and switches on the expose time-relay 24. Thus, the process of formation of the latent electrostatic image of the hologram in the AMS-film 3 by means of laser 1, optical scheme for hologram formation 2, and opto-electric scheme 24–26 for determining and setting of the exposure time begins. The determination of exposure time unit 25 employ the predetermined holographic sensitivity and the reference beam intensity measured with the photo-sensor 26 to determine the exposure time and cut off the exposure time-relay 24. This occurs as soon as the time of its operation, from the moment it is switched on, becomes equal to the time defined by the unit 25.

Developing the Latent Electrostatic Image with the Pre-Set Value of the Diffraction Efficiency.

This is performed by means of the electric circuit for development of the latent electrostatic and latent photoelectret image 30,20,21, and the opto-electric scheme for development process restriction by the pre-set level of the diffraction efficiency, 26,32–35. After finishing the stage of "hologram exposure", the trailing edge of the pulse of the expose time-relay 24 switches on the development time-relay 30. The leading edge of the pulse of the development time-relay 30 opens the development/erasing key-commutator 20 and connects it via the development/erasing voltage unit 21 to the transparent conducting sub-layer 4. Electric current runs through the sub-layer 4 and heats it, resulting in a heating of the AMS-film 3 and a transformation of the latent electrostatic image into a geometrical relief on the surface of the AMS-film. At this stage, the hologram image restores and the diffraction efficiency is continuously determined and entered to the development comparator 35 by means of the photo-sensor 26, the unit of measurement of the reference beam intensity in the initial moment of the development 33, unit of separation and measurement of the variable component of the reference beam light intensity 32 during the development, and the diffraction efficiency calculation unit 34. In comparator 35, the measured value of diffraction efficiency is compared with the pre-set value. As soon as these values coincide, the comparator 35 interrupts the operation of the development time-relay 30. The trailing edge of the pulse of the development time-relay 30 cuts off the development/erasing key-commutator 20 and disconnects the development/erasing voltage unit 21 from the transparent conducting sub-layer 4, and the development process terminates.

However, in the case when the value of the diffraction efficiency measured during the development is, for some reason, not able to reach the pre-set value in the comparator 35, the development time is restricted by means of the opto-electric scheme for the development restriction 26, 32–34, 38,39 on basis of finding the maximum of the dependence of the diffraction efficiency on the development time. The values of the diffraction efficiency as determined by the photo-sensor 26 and units 32–34, are also entered into the differentiator 38. As soon as the value of the first derivative of the dependence of diffraction efficiency on development time becomes equal to zero, the comparator of differentiator 39 cuts off the development time-relay 30, and the development process terminates. In practice, the device determines whether the time derivative of the diffraction efficiency has reached zero by checking if the calculated derivative has reached a termination condition. The termination condition can for instance be that the calculated derivative changes sign from a positive numerical value to a negative numerical value, or it may be that the absolute value of the calculated derivative is less than a threshold value which is close to zero. There may of course be other ways to check this condition, the aim is to terminate development process as soon as the diffraction efficiency stops increasing and levels out with time.

The Double Exposure Mode.

Activation of the device in the double exposure mode. This is performed by pressing the button K2, "Photoelectret state". As soon as this takes place, the output of the expose time-relay 24 is connected to the input of the photoelectret state formation time-relay 27. The device operation in this mode is supported by the opto-electric scheme for latent photoelectret image formation 11–26, 27–29. This includes the first three stages of the "real time scale mode," where the reduction of the electron and hole components of the dark conductivity occurs and the latent electrostatic image of hologram is formed. In addition there are two new stages, the formation and fixation of the latent photoelectret image.

Formation of the latent photoelectret image. After finishing the third stage of the "real time scale mode", as a result of which the latent electrostatic image is formed, the trailing edge of the pulse of the expose time-relay 24 switches on the photoelectret state formation time-relay 27. The photoelectret state formation time-relay 27 opens the development/ erasing key-commutator 20 and connects the development/ erasing voltage unit 21 to the transparent conducting sub-layer 4. The latter is heated and as a result, heats up the AMS-film 3, and the latent electrostatic image is transformed into a latent photoelectret image. The heating time of the AMS-film 3 for transforming the latent electrostatic image into a photoelectret image, is restricted by the opto-electric scheme for restriction of the transformation of the latent electrostatic image into the latent photoelectret image, 26,32–34,37. This is performed as follows: During the heating of the AMS-film 3 simultaneously with formation of the latent photoelectret image, a partial development of the latent electrostatic image into a visible one takes place. The diffraction efficiency of the restored hologram image is monitored. The measured value of diffraction efficiency is entered to the pulse heating comparator 37, which switches off the photoelectret state formation time-relay 27 as soon as the measured value of diffraction efficiency becomes equal to 0.005. The development/erasing key-commutator 20 is thus switched off, and the development/erasing voltage unit 21 is disconnected from the transparent conducting sub-layer 4.

Fixing the Latent Photoelectret Image. This is performed immediately after the stage of forming the latent photoelectret image. The trailing edge of the pulse of the photoelectret state formation time-relay 27 switches on the flash lamp switching unit 28, the flash lamp 29 comes into operation and illuminates the AMS-film surface 3. This results in shielding and fixation of the latent photoelectret image.

The development of the latent photoelectret image occurs at activation of the device operation in the "real time scale mode" which occurs after loading of the holographic object. The obtained latent photoelectret hologram image of the object in its initial state and the obtained latent electrostatic image of the same object, but subjected to loading, will be developed and fixed simultaneously.

The Mode of Erasing the Developed Image. This mode is intended for erasing the developed hologram image before reuse of the registering medium for hologram registration. To start the "mode of erasing of developed image," it is necessary to press the button K3 "Erasing." The erasing time-relay 31 is thus switched on and the leading edge of its pulse turns on the developed/erasing key-commutator 20 and connects the development/erasing voltage unit 21 to the transparent conducting sub-layer of registering medium 4. Simultaneously, the leading edge of the pulse erasing time-relay 31 switches on the flash lamp switching unit 28. Flash lamp 29 illuminates the AMS-film 3 and the reduction of its surface- and bulk space charges occurs. The time of erasing of the developed image is restricted by the opto-electric scheme 26,32–34,36 for the developed image erasing restriction by the pre-set level of the diffraction efficiency. As soon as the diffraction efficiency reaches a value of 0.01 in the course of erasing of the developed image, the erasure comparator 36 cuts off the erasure time-relay 31. The trailing edge of pulse of the erasure time-relay 36 therewith switches off the development/erasing key-commutator 20, and the erasing process terminates.

Experimental Verification of the Device.

To check the operation of the device, an AMS-film consisting of 92 wt % of a copolymer comprising N-epoxypropylcarbazole with buthylglycedil ether (EPC +5 wt % BGE) doped with 5 wt % methyl-9-(4-dodecyl-oxyphenyl-1,3-selenathiol-2-ylidene)-2,5,7-trinitrofluorene-4-carboxylate (MDOSTFC) and 3 wt % hexadecyl-2,7-dinitro-dicyanomethylenfluorene-4-carboxylate (H-DDFC). The AMS-film was deposited on a glass substrate with an area of 50*40 $mm^2$, and coated with a transparent conducting sub-layer of the tin dioxide with resistance 20 ohm with two silver contacts. The active surface area of the registering medium was 40*40 $mm^2$ and the thickness of the AMS-film was 1 $\mu$m.

The maximal allowable values of the surface potential, at which local breakdowns of the AMS-film are not yet observed and the optimal value of the charging current at which the destruction of the film surface does not yet occur, are set before initiating the registration of the holograms. These values were found slightly dependent on the starting temperature of registering medium in the temperature range of 15–40° C., and equal to 125 V/$\mu$m and 1 $\mu$A/$cm^2$, respectively. In addition, the following voltages were determined: The output voltage from the high voltage source 12 which controlled the mentioned conditions of charging, the voltage from the starting temperature voltage source 9 which provides setting and maintenance of the optimal starting temperature in the temperature range 15–40° C., and the voltage from the development/erasing voltage unit 21 which provides the optimal heating rate about $10^{6°}$ C./sec. These voltages were equal to 15–30 kV, 10 V, and 300 V, respectively.

Then the equipment was subject to the following tests:

1. Determination of the optimal starting temperature. For determining the optimal starting temperature, the device operates in the "real time scale mode", and the holographic sensitivity for various spatial frequencies and a signal-to-noise ratio in the restored hologram image of a "black-and-white" picture are measured. Then: i) charging of the AMS-film surface is performed with an uncontrolled corona discharge at voltage 20 kV, the charging time is set by charging time-relay 11 and it approximately corresponds to the charging time of the AMS-film to the potential of saturation; ii) reducing the electron and hole components of dark conductivity is not performed, and the output of the charging time-relay 11 is connected directly to the input of the expose time relay 24; iii) the exposure time is set by the expose time-relay 24, and the exposition determination unit 25 has been switched off, iv) the diffraction efficiency value equal to 30% is set in the development comparator 35 and development time is mainly restricted by the opto-electric scheme 26, 32–34,38,39 for restriction of development process on maximum of the diffraction efficiency dependence on development time. As a result of measurements, it was found that the optimal starting temperature is 36° C. Thus, the holographic sensitivity for optimal spatial frequency of 600 $mm^{-1}$ is 1300 $m^2$/J, the resolution is 1100 $m^2$/J, and signal-to-noise ratio is 58. In the same time, for starting temperature of registering medium equal to 20° C., the holographic sensitivity is 1100 $m^2$/J for optimal spatial frequency of 450 $mm^{-1}$, the resolution is 900 $mm^{-1}$, and the signal-to-noise ratio is 50. Therefore, including the electric circuit of establishment of optimal starting temperature into the device makes it possible to achieve optimal values of information parameters. Besides, it should be noted that it also makes it possible to obtain reproducible information parameters of the device with accuracy no less than 5%.

2. Determination of the influence of the control procedure of the corona discharge during the AMS-film surface charging on the information properties of the device. The same information parameters were determined in these measurements as when determining the optimal starting temperature value. However, in contrast to the measurements considered in test 1, the starting temperature of registering medium equal to 36° C. was set in these measurements, and the charging of the AMS-film surface was performed in a controlled corona discharge. The maximal allowable value of surface potential equal to 125 V was pre-set in the surface potential comparator 17, and the optimal charging current was set in the corona current measuring unit 16 to be 1 $\mu$A. As a result of measurements, it was found that the holographic sensitivity is 1200 $m^2$/J at optimal spatial frequency 545 $mm^{-1}$, resolution is 1000 $mm^{-1}$, and signal-to-noise ratio is 125. Therefore, the incorporation of the control of the corona discharge allows one to enhance the signal-to-noise ratio more than twice, although it leads to some decrease of resolution and holographic sensitivity.

3. Determination of the influence of reduction of electron and hole components of the dark conductivity on information properties of the device. In contrast to the measurement procedure considered above in test 1 and 2, in the course of these measurements the output of the charging time-relay 11 is connected to the input of the pulse preheating time-relay 19, and the electric circuit of reducing the electron and hole component of the dark conductivity 11–18,19–23,41 has been used to full extent in these measurements. As a result of measurements, it was found the following: the holographic sensitivity at optimal spatial frequency 700 $mm^{-1}$ is 1650 $m^2$/J, and resolution is 1700 $mm^{-1}$. Additional experiments have shown that the maximal allowable value of the surface potential preserves the AMS-film surface until the moment when the development of the latent electrostatic image into a visible image is started. This value exceeds the corresponding value for the case when no reducing the electron and hole components of dark conductivity was applied by not more than 20%. Such a considerable increase of the optimal spatial frequency of transmitting characteristic and the resolution ability is not only due to the reduction of bulk dark conductivity, but due to reduction of the surface dark conductivity too. As for the increase of the signal-to-noise ratio, this can also be connected with reducing the spontaneous electret state which acts as an additional source of noise. Besides, in the course of these measurements, the greatest possible ratio of light intensities of the reference and object beams under hologram registration is determined. It comprises $10^6$ and is more than an order of magnitude larger than that in the case when the dark conductivity reduction has not been applied. Thus, incorporation of the pulse preheating time-relay, the dark conductivity comparator, and the recharging time-relay allows one to enhance the holographic sensitivity and resolution ability of the device, on the average, by a factor of 1.5.

4. Checking the accuracy of the restriction of the latent electrostatic image development. This may be performed by means of the opto-electric scheme for the development restriction 26,32–35 using the pre-set value of the diffraction efficiency. As it was considered above, the diffraction efficiency is measured with a photo-sensor installed in zero diffraction order, and with units 32–34. The measured diffraction efficiency is entered into the development comparator 35, where it is compared with the pre-set value of diffraction efficiency. In these measurements, the development process has been terminated at values of diffraction efficiency equal to 0.005; 0.01; 0.1; 1; 5 and 10%, respectively. After terminating the development process at the pre-set value of diffraction efficiency, the diffraction efficiency is measured in each case by usual means, i.e. it is found as the division of the measured light intensities in the minus first diffraction order by the reference beam, As a result of the performed measurements, it was found that the accuracy of termination of the development process by the pre-set value of the diffraction efficiency is within ±0.5% for diffraction efficiencies in the range of 1–10%; ±2.5 for diffraction efficiencies in the range of 0.1%, and ±15% for the diffraction efficiency of 0.005%. Thus, the device restricts the process of hologram development by the pre-set value of diffraction efficiency with high degree of accuracy. The employment of elements and units enabling measuring the diffraction efficiency in zero diffraction order allows one to make this a more efficient device which is universal, that is, independent on the scheme of hologram registration.

5. Checking the device in the "double exposure mode". This was also checked during the determination of the holographic sensitivity of the device in the photoelectret latent image formation mode, as well as the lifetime of the latent photoelectret image. It is found that the holographic sensitivity of the device in the photoelectret latent image formation mode is, on the average, 30% less than that in the case of the latent electrostatic image formation. The lifetime of the latent photoelectret image, estimated from the delay time prior to the development, comprised 20 h, which is three orders of magnitude greater than the lifetime of the latent electrostatic image. By lifetime we mean the relaxation time, that is the time before the image has weakened to such an extent that it can no longer be employed in the formation of the interferogram. Thus, incorporation of the latent photoelectret image formation time-relay, as well as the flash lamp switching unit and the flash lamp itself into the device makes possible the use of the device for double exposure holographic interferometry.

6. Checking the influence of the reduction of the surface and bulk space charges in the AMS-film before erasing with the flash lamp on the cycling ability. The cycling ability was estimated as the number of cycles of registration, development and erasing of holograms the AMS-film could be exposed for before the holographic sensitivity and signal-to-noise ratio showed a two times reduction. When the flash lamp was used, the cyclic ability being estimated from the reduction of diffraction efficiency and reduction of the signal-to-noise ratio was 4800 rounds compared to 1600 rounds without the lamp. That is, about three times more than in the case without the flash. Thus, the incorporation of the flash lamp switching unit and the flash lamp into the device allowed to enhance the cycling ability of the AMS-films by a factor of three.

What is claimed is:

1. A device for performing registration of optical holograms on an amorphous molecular semiconductor film, comprising:
   a source of coherent light;
   an optical device for hologram formation;
   a registering medium comprising an amorphous molecular semiconductor film deposited on a glass substrate which is pre-coated with an electric conducting and transparent sub-layer;
   a first electric circuit for charging the amorphous molecular semiconductor film by a corona discharge, the first electric circuit including a high voltage source, a corona electronic charging time-relay, and an electromechanical shutter;
   a second electric circuit for measuring and restricting the temperature of the amorphous molecular semiconductor film, the electric circuit including a temperature sensor, a comparator, and a key-commutator;
   an exposure time-relay;
   a development voltage supply;
   a development time-relay; and
   a first opto-electric circuit for restriction of the development process as given by the pre-set value of the diffraction efficiency, the first optoelectric circuit comprising:
   a photo-sensor;
   an erasing time-relay;
   an opto-electronic circuit for the erasing process control;
   a third electric circuit for setting the optimal start temperature of the amorphous molecular semiconductor film where the output of the circuit is connected to the input of the corona electronic charging time-relay, and which contains a voltage source that is connected via the start temperature key-commutator to the conducting sub-layer of the registering medium, and an indicator which displays when the registering medium has reached the optimal start temperature;
   a fourth electric circuit for controlling the charging of the surface of the amorphous molecular semiconductor film, the fourth electric circuit including a corona discharge current measuring unit connected between the high voltage supply and electrically conducting transparent sub-layer of the registering medium, and a surface potential measuring unit containing an electrostatic probe located above the surface of the amorphous molecular semiconductor film and which is connected to the input of the surface potential comparator and to where the output of the comparator is connected to the input of the charging time-relay; and
   a fifth electric circuit for the reduction of the electron and hole components of the dark conductivity of the amorphous molecular semiconductor film, the fifth electric circuit including a pulse preliminary electronic heating time-relay that is connected to an output of the corona electronic charging time-relay, to an input of the development/erasing key commutator, to an input of the recharging time-relay, and to a dark electroconductivity comparator connected between the surface potential measuring unit and the pulse preliminary electronic heating time-relay, where the recharging time-relay is connected to an output of the pulse preliminary time-relay, and to an input of the exposure time-relay, the high voltage supplier and recharging comparator, and where the recharging comparator is connected between the surface potential measuring unit and recharging time-relay, wherein an opto-electric circuit for the development/erasing restriction by the pre-set value of the diffraction efficiency as measured in the zero diffraction order is incorporated into the device, by including a unit for separating and measuring the variable component of the reference beam light intensity and a unit for measuring and memorizing the reference beam intensity at the initial moment of time of development and erasing, mutually connected in parallel, and where the input of which is connected to the photo-sensor output installed in the zeroth diffraction order, and its output is connected to the input of the diffraction efficiency calculating unit, and the diffraction efficiency calculating unit, the output of which is connected to the inputs of the development/erasing comparators, and where the outputs of the development/erasing comparators are connected to the inputs of the time-relays of development and erasing process, respectively.

2. The device according to claim 1, further comprising a flash lamp and a flash lamp switching unit, the input of which is connected to the input of the erasing time-relay.

3. The device according to claim 1, wherein in the case when one cannot estimate in advance the value of the limiting diffraction efficiency and/or it is impossible to reach the pre-set value of the diffraction efficiency, an opto-electric scheme for restricting the development process when reaching a pre-set value of the time derivative of the diffraction efficiency is incorporated into the device, by including:

a unit for separating and measuring the variable component of the reference beam light intensity;

a unit for measuring and memorising the reference beam intensity at the initial moment of time of the development process which is connected in parallel with the unit for separating and measuring the variable component of the reference beam light intensity, and where the inputs of these units are connected to the output of the photo-sensor located in the zeroth diffraction order, and their outputs are connected to a diffraction efficiency calculating unit;

a diffraction efficiency calculating unit, where the output is connected to a differentiator;

a differentiator, where the output is connected to the input of a comparator of a differentiator; and a comparator of the differentiator where the input is connected to the output of the development time-relay.

4. The device according to claim 1, further comprising:

a second opto-electric circuit for latent photo-electret formation, the second opto-electric circuit including a photo-electret state formation time-relay where the input is connected to the output of the exposure time-relay and the output is connected to the input of the development/erasing key-commutator, a flash lamp with a flash lamp switching unit that is connected to the output of the electronic latent photo-electret image formation time-relay and the flash lamp; and a third opto-electric circuit for restricting the conversion of the latent electrostatic image into the latent photo-electret image, the third opto-electric circuit including a unit for separating and measuring the variable component of the light intensity of the reference beam that is connected between the output of the photo-sensor, which is installed in the zeroth diffraction order, and an input of the diffraction efficiency calculation unit, and a unit for measuring the intensity of the reference beam and memorising at the initial time, which is connected in parallel with the unit for separating and measuring the variable component of the light intensity of the reference beam, and a pulse heating comparator where the input is connected to the output of the diffraction efficiency calculating unit and the output is connected to the input of the electronic photo-electret image formation time-relay.

* * * * *